United States Patent
Redman et al.

(10) Patent No.: US 11,524,508 B2
(45) Date of Patent: Dec. 13, 2022

(54) MECHANISM FOR COUPLING INDEPENDENT GEAR TRAINS AND ASSOCIATED PRINTING DEVICE

(71) Applicant: ILLINOIS TOOL WORKS INC., Glenview, IL (US)

(72) Inventors: Randall L. Redman, Beavercreek, OH (US); Justin T. Blackford, Sidney, OH (US); Michael A. Whitby, Tipp City, OH (US); Austin M. Knoblauch, Fairborn, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 100 days.

(21) Appl. No.: 16/824,102

(22) Filed: Mar. 19, 2020

(65) Prior Publication Data

US 2021/0291557 A1 Sep. 23, 2021

(51) Int. Cl.
*B41J 7/62* (2006.01)
*F16H 61/22* (2006.01)
*B41J 11/64* (2006.01)
*B41J 15/04* (2006.01)

(52) U.S. Cl.
CPC ............... *B41J 7/62* (2013.01); *F16H 61/22* (2013.01); *B41J 11/64* (2013.01); *B41J 15/044* (2013.01); *B41J 15/046* (2013.01)

(58) Field of Classification Search
None
See application file for complete search history.

(56) References Cited

U.S. PATENT DOCUMENTS

| | | | |
|---|---|---|---|
| 5,645,360 A * | 7/1997 | Iwane | B41J 2/315 400/120.16 |
| 5,882,126 A | 3/1999 | Bowling | |
| 6,604,874 B2 * | 8/2003 | Carriere | B41J 3/4075 400/613 |
| 8,162,553 B2 * | 4/2012 | Vandermeulen | B41J 15/044 400/613 |
| 8,517,618 B2 * | 8/2013 | Cartwright | G01G 19/4144 400/613 |
| 2002/0162411 A1 * | 11/2002 | Faucher | B41J 23/025 74/414 |
| 2005/0036817 A1 * | 2/2005 | Wilken | B41J 11/46 400/582 |
| 2018/0172119 A1 * | 6/2018 | Lin | B41J 23/025 |

FOREIGN PATENT DOCUMENTS

| | | | | |
|---|---|---|---|---|
| EP | 1564014 A2 * | 8/2005 | | B41J 3/60 |
| WO | WO-2014098920 A1 * | 6/2014 | | B41J 3/4075 |

* cited by examiner

*Primary Examiner* — Matthew G Marini
(74) *Attorney, Agent, or Firm* — Thompson Hine LLP

(57) ABSTRACT

A printer device includes a main housing including a print media cassette receiving slot. A first drive assembly of the main housing includes a motor operatively coupled to rotate a drive gear. A print media cassette is removably inserted into the print media cassette receiving slot, and includes a second drive assembly having a driven gear that is engaged with the drive gear. One of the drive gear or the driven gear is mounted for movement such that at least one of (i) a position of an axis of the drive gear is movable relative to the main housing or (ii) a position of an axis of the driven gear is movable relative to the printer cassette. A retaining mechanism includes a portion movable into a gear train coupling position in which the drive gear and the driven gear are held in driving contact with each other.

17 Claims, 7 Drawing Sheets

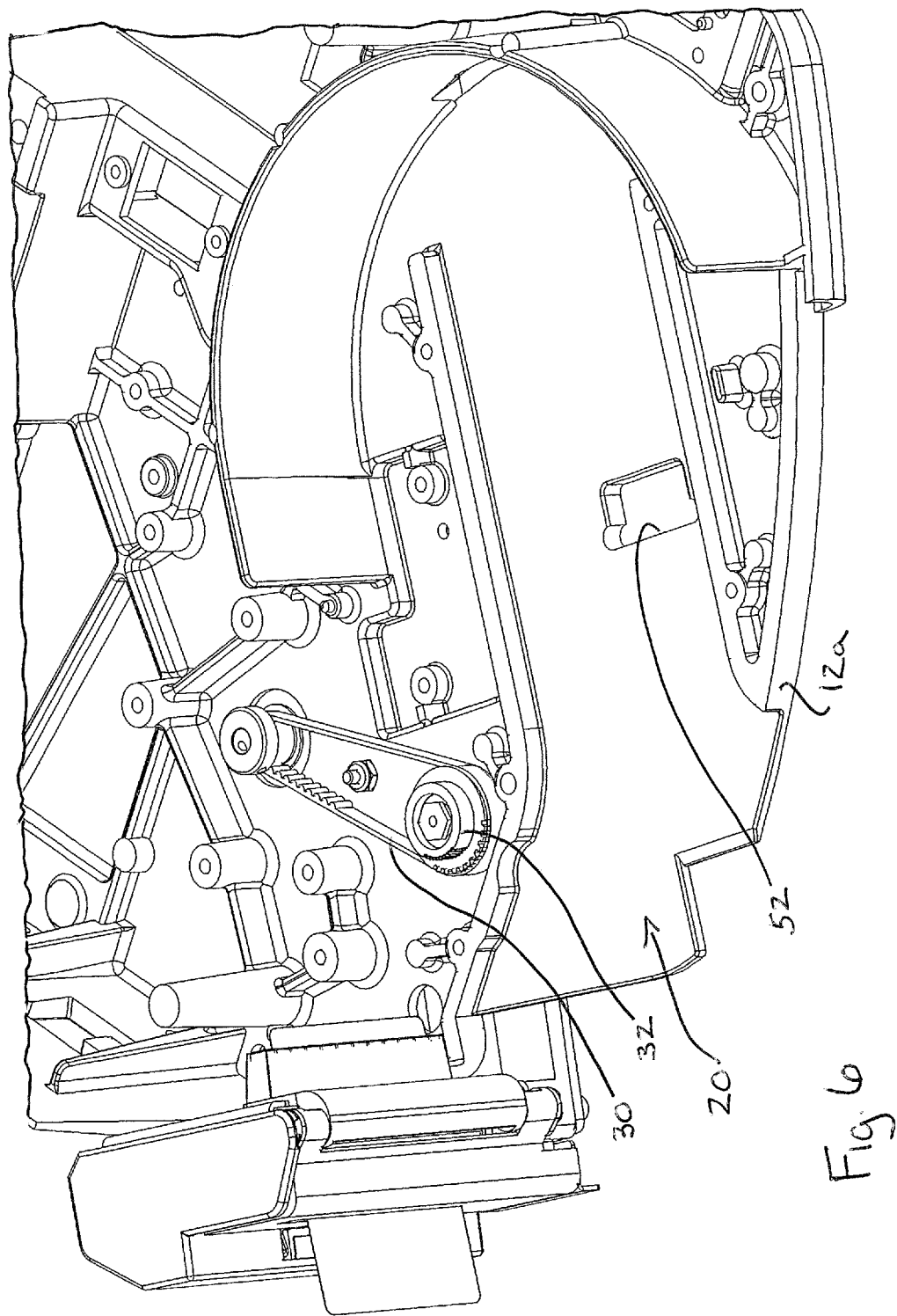

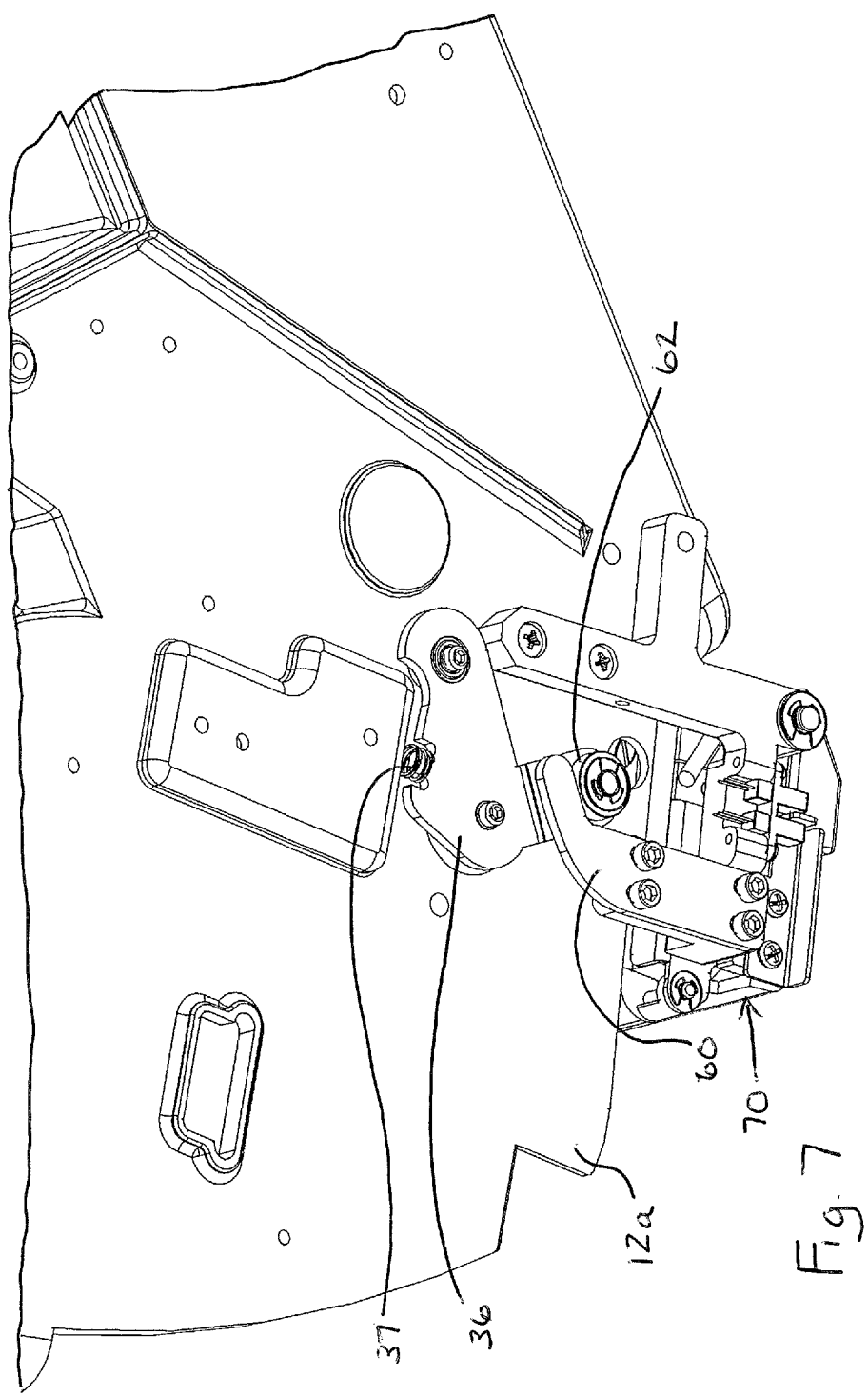

MECHANISM FOR COUPLING INDEPENDENT GEAR TRAINS AND ASSOCIATED PRINTING DEVICE

TECHNICAL FIELD

This application relates generally to devices in which one gear train engages and drives another independent gear train, more specifically, to a mechanism for coupling independent gear trains in a device such as a printer.

BACKGROUND

In label printing devices of the type used in supermarkets or groceries it is common for the printer to have a removable label cassette. This allows the printer to be quickly modified for changeover from one label type to another by removing a cassette carrying one label type and inserting a cassette carrying another label type. The cassettes include components, such as a label stock take-up real and/or label stock print feed roller that must be driven to move the label stock for printing during print operations. For this purpose, the cassette may include a gear train to be driven by a drive gear train that is associated with the main printer housing. In order to account for possible variances between cassettes, the drive gear train of the printer housing may be mounted with a certain degree of play that facilitates engagement between a drive gear of printer housing with a driven gear of the cassette. The drive gear may be biased into a position that urges the drive gear toward the driven gear of the cassette when the cassette is installed in the printer housing. However, in some situations, such as an attempt to drive the label stock backward instead of forward, the reactive forces between the drive gear and the driven gear may caused the drive gear to walk away from the driven gear into a position in which the teeth of the two gears are no longer in driving contact.

Accordingly, it would be desirable to provide a mechanism that facilitates better coupling of the gear trains when the cassette is in the installed, use position, while at the same time permitting the desired play of the drive gear train to account for variances between label cassettes.

SUMMARY

In one aspect, a printer device includes a main housing including a print media cassette receiving slot. A first drive assembly is mounted to the main housing, the drive assembly including a motor operatively coupled to rotate a drive gear. A print media cassette is removably inserted into the print media cassette receiving slot, wherein the print media cassette includes a second drive assembly having a driven gear that is engaged with the drive gear of the first drive assembly. One of the drive gear or the driven gear is mounted for movement such that at least one of a position of an axis of the drive gear is movable relative to the main housing or a position of an axis of the driven gear is movable relative to the printer cassette. A retaining mechanism includes a portion movable between a gear train coupling position and a gear train release position, wherein, in the gear train coupling position, the portion is positioned to hold the drive gear and the driven gear in driving contact with each other, wherein, in the gear train release position, the portion is positioned to allow movement of at least one of the axis of the drive gear or the axis of the driven gear.

In another aspect, a primer device includes a main housing including a print media cassette receiving slot. A first drive assembly is mounted to the main housing, the first drive assembly including a motor operatively coupled to rotate a drive gear, wherein the drive gear is mounted for movement such that a position of an axis of the drive gear is movable. A print media cassette is removably inserted into the print media cassette receiving slot, wherein the print media cassette includes a second drive assembly having a driven gear that is engaged with the drive gear of the first drive assembly. A retaining mechanism includes a portion movable between a gear train coupling position and a gear train release position, wherein, in the gear train coupling position, the portion cooperates with the first drive assembly to hold the drive gear in driving contact with the driven gear, wherein, in the gear train release position, the portion is positioned to allow movement of the axis of the drive gear away from the driven gear.

In a further aspect, a method of engaging a printer cassette in a cassette slot of a main housing of a printer device involves: (a) while a locking arm is in a gear train release position, moving the printer cassette into the cassette slot such that a driven gear of the printer cassette is moved into engagement with a drive gear of the main housing, with at least one of (i) a position of an axis of the drive gear moving relative to the main housing during the engagement or (ii) a position of an axis of the drive gear moving relative to the printer cassette during the engagement; and (b) moving the locking arm into a gear train coupling position in which the locking arm causes the drive gear and the driven gear to remain engaged by limiting movement of at least one of (i) the position of the axis of the drive gear relative to the main housing or (ii) the position of the axis of the drive gear relative to the printer cassette.

In another aspect, a printer device includes a main housing including a print media cassette receiving slot. A first drive assembly is mounted to the main housing, the first drive assembly including a motor operatively coupled to rotate a drive gear. A print media cassette is removably inserted into the print media cassette receiving slot, wherein the print media cassette includes a second drive assembly having a driven gear that is engaged with the drive gear of the first drive assembly. A retaining mechanism includes a portion movable between a gear train coupling position and a gear train release position, wherein, in the gear train coupling position, the portion is positioned to hold the drive gear and the driven gear in driving contact with each other, wherein, in the gear train release position, the portion is positioned to allow disengagement of the drive gear and the driven gear.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 6 is a partial perspective view of the device base showing cassette slot and drive gear; and FIG. 7 is a partial bottom perspective showing a retaining mechanism locking arm in gear train coupling position.

DETAILED DESCRIPTION

Figure 1:
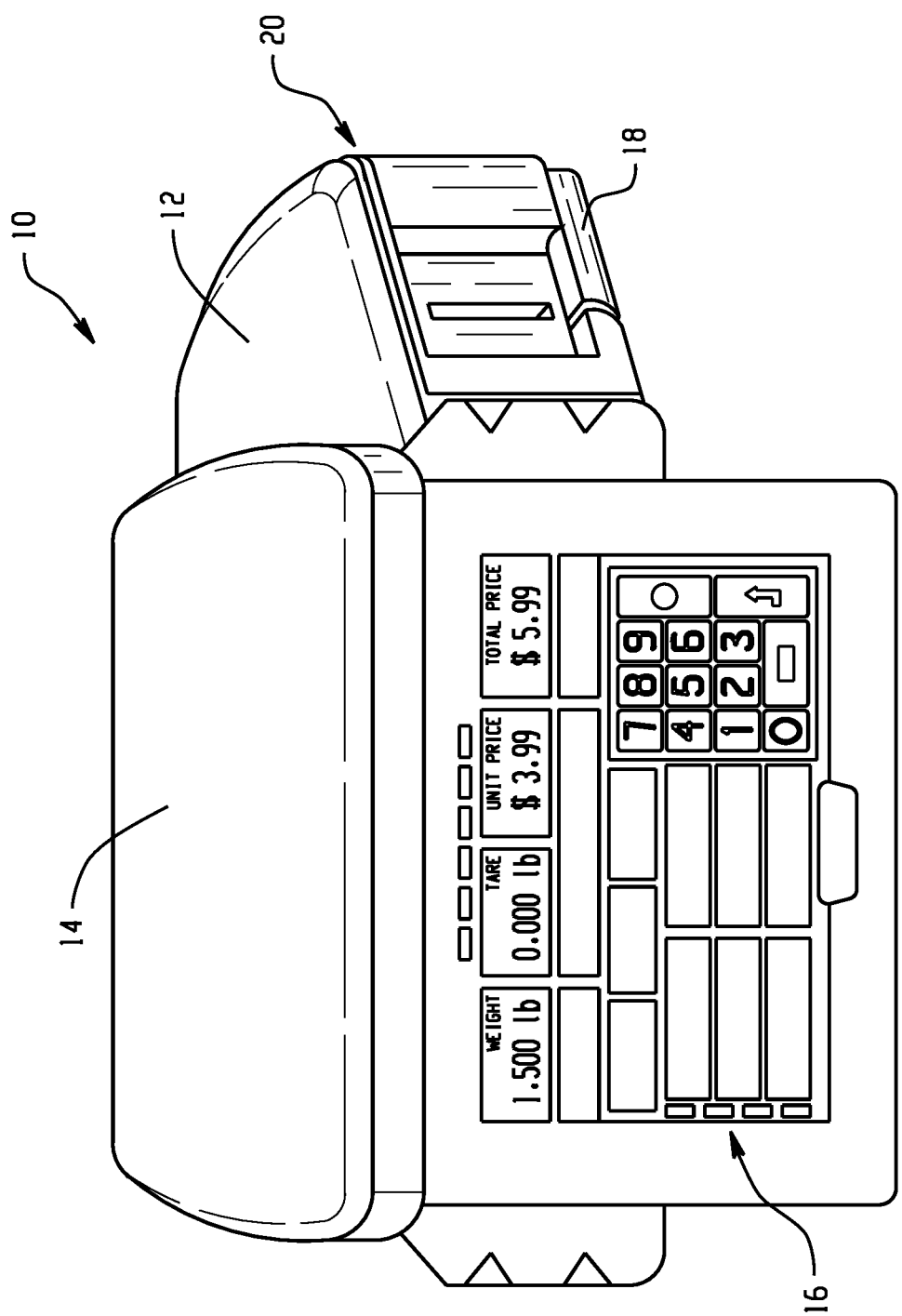
FIG. 1 is a perspective view of a weighing device.

Referring to FIG. 1, a food item weighing scale 10 is shown and incorporates a printer device, in particular a label printing device. The scale 10 includes a housing 12, a weighing platter 14, an internal load cell (not shown), a user interface 16 and a label cassette 18 removable inserted into a cassette receiving slot 20 at the side of the housing 12. Although illustrated in the context of a weighing scale that prints and outputs labels to be applied to products, it is contemplated that the features of this application are applicable to printer devices that do not form part of weighing scale, and to printer devices that print on a print media other than labels (e.g., non-adhesive, paper media).

Figure 2:
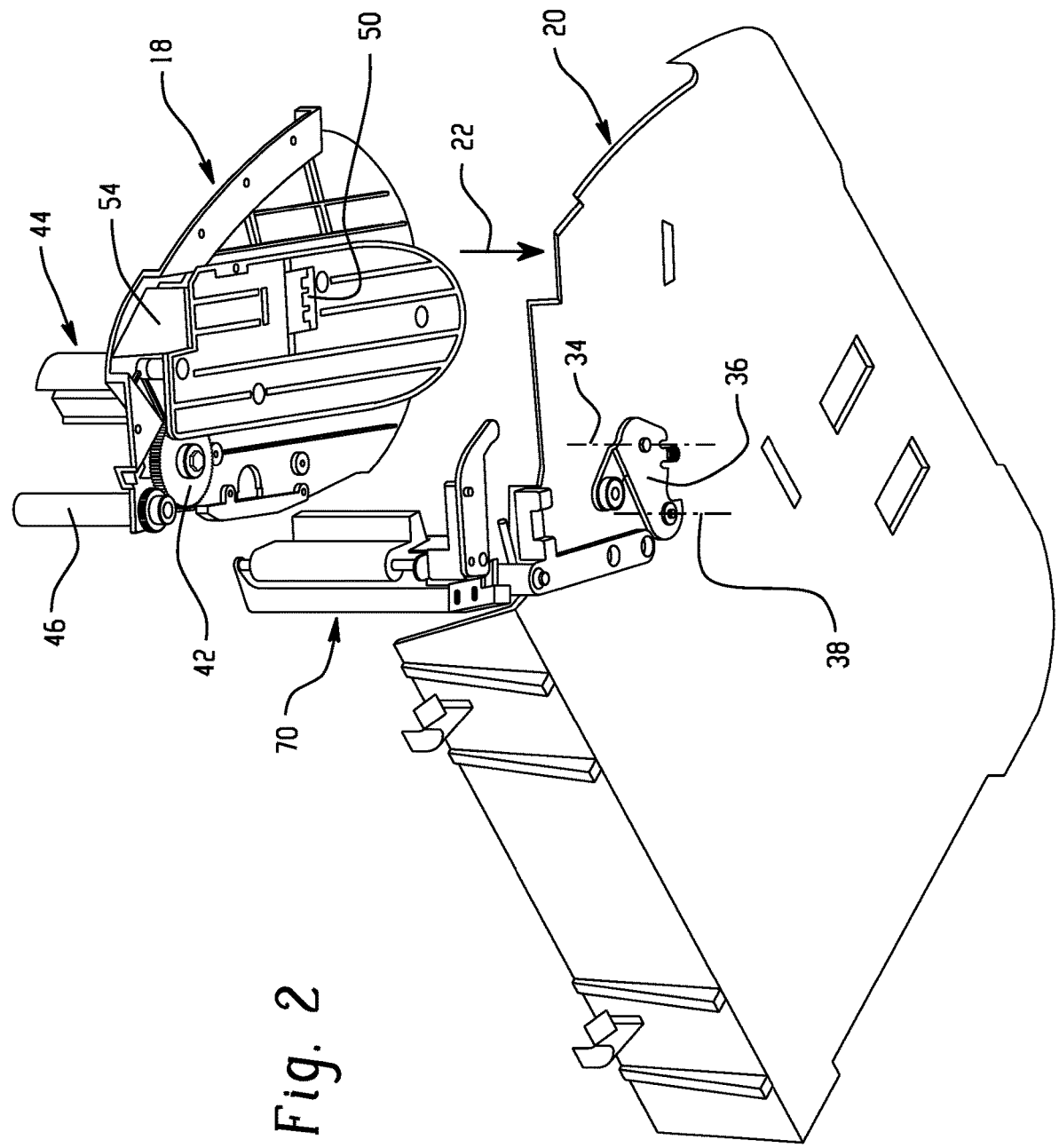
FIG. 2 is a partial bottom view of the weighing device with cassette removed.
Figure 3:
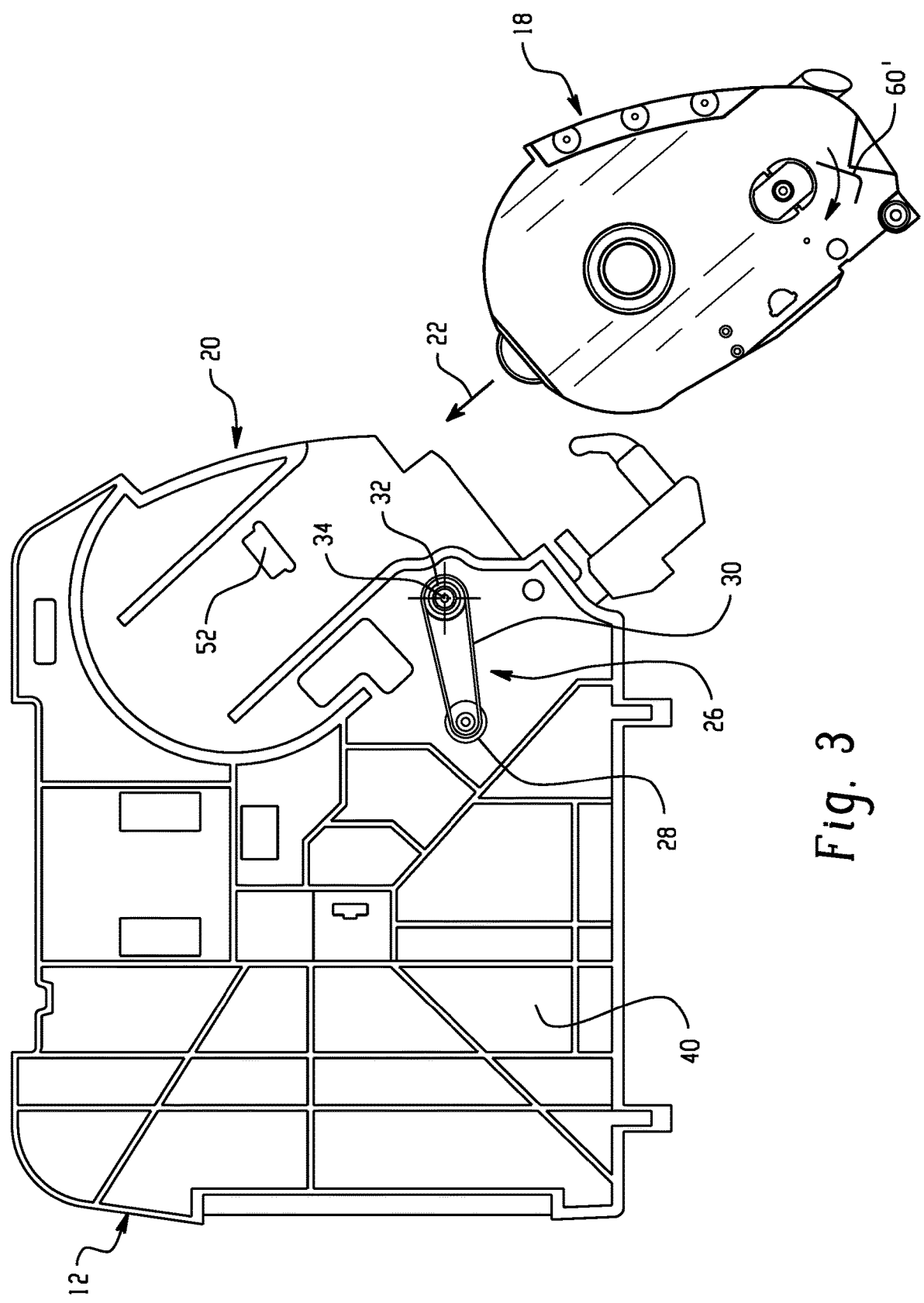
FIG. 3 is a partial top plan view with cassette removed.

FIGS. 2 and 3 show exploded views of a bottom or base part 12a of the housing 12 and cassette 18, with the cassette 18 in a location spaced from the housing (i.e., cassette not engaged with the housing). The cassette moves per arrow 22 for insertion into the housing slot 20. As seen, the housing incorporates a drive assembly 26, that includes a motor 28 operatively coupled, such as by belt 30, to rotate a drive gear 32. The drive gear 30 is mounted for movement such that a position of an axis 34 of the drive gear is movable. Here, the drive gear 32 is mounted on a pivot arm 36 with an associated pivot axis 38 that is spaced from the axis 34 of the drive gear 32. In the illustrated embodiment, the pivot arm 36 is located at the bottom side of housing bottom wall 40, and the motor 28, belt 30 and drive gear 32 are located at the upper side of the housing bottom wall 40.

The cassette 18 includes a driven gear 42 that engages with the drive gear 32 when the cassette is installed in the operating position. The driven gear 42 may, for example, be used to drive components of the cassette such as a label stock take-up real 44 and/or label stock print feed roller 46. The cassette 18 includes a latch 50 that engages with an opening 52 of the housing to hold the cassette in the operating position, where the latch is releasable by manual pressing of a release 54 that moves the latch out of the opening.

Figure 4:
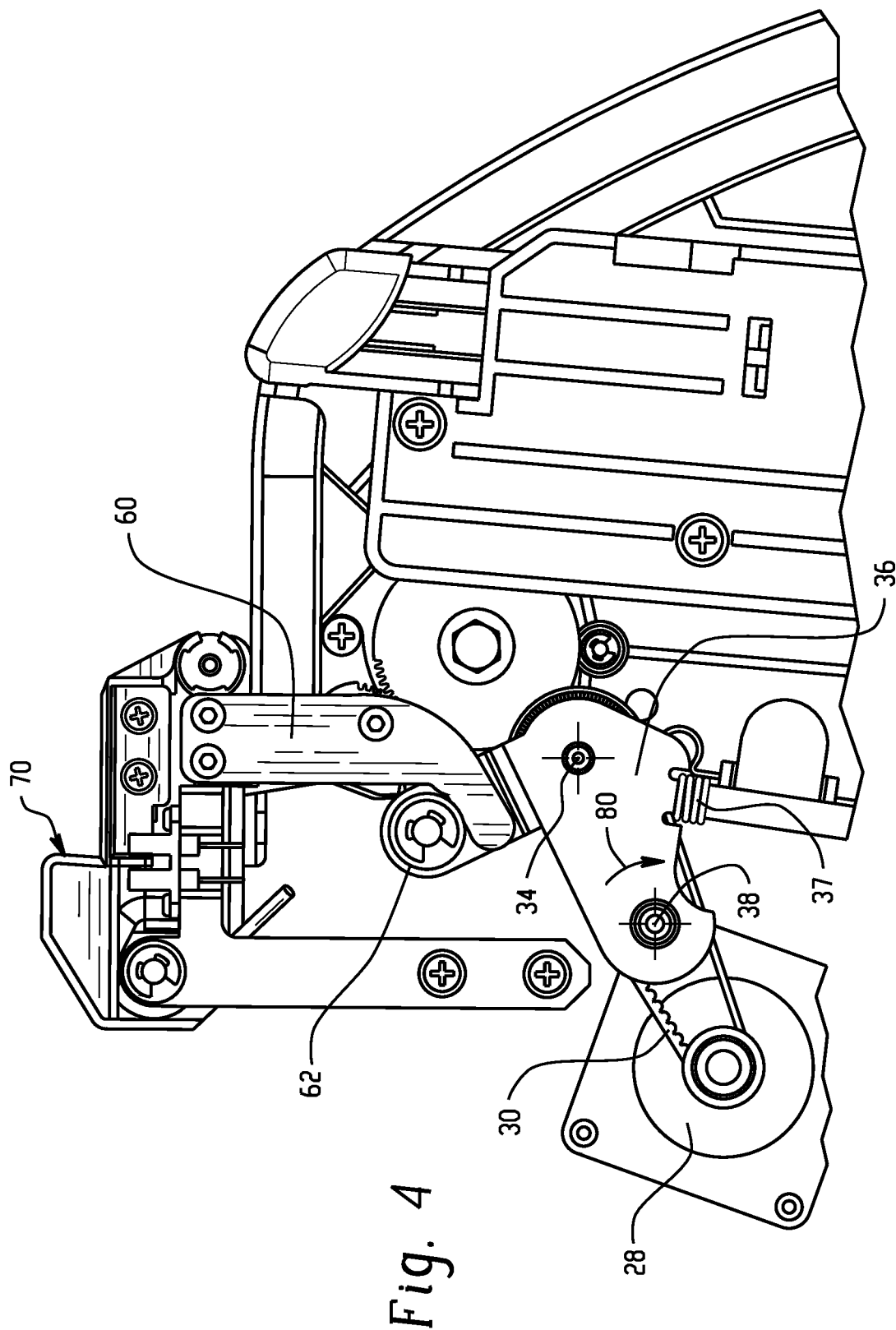
FIG. 4 is schematic view of a retaining mechanism locking arm in gear train coupling position.

When the cassette 18 is inserted into the slot 20, the driven gear 42 moves toward and into contact with the drive gear 32. The drive gear 32, including the drive axis 34, may move slightly, per arrow 80 in FIGS. 4 and 5, to accommodate the insertion and to allow the teeth of the two gears to mesh. Notably, the pivot arm 36 is biased by a spring 37 toward a position into engagement with the driven gear (i.e., biased in a direction opposite direction 80).

In order to maintain the gear teeth in proper driving mesh during reverse rotation of drive assembly 26, a retaining mechanism is provided. Here the retaining mechanism is form by a locking arm 60 that is rotatably connected to the housing 12 and, in particular, the locking arm 60 is connected for rotation with a cutter assembly 70.

Figure 5:
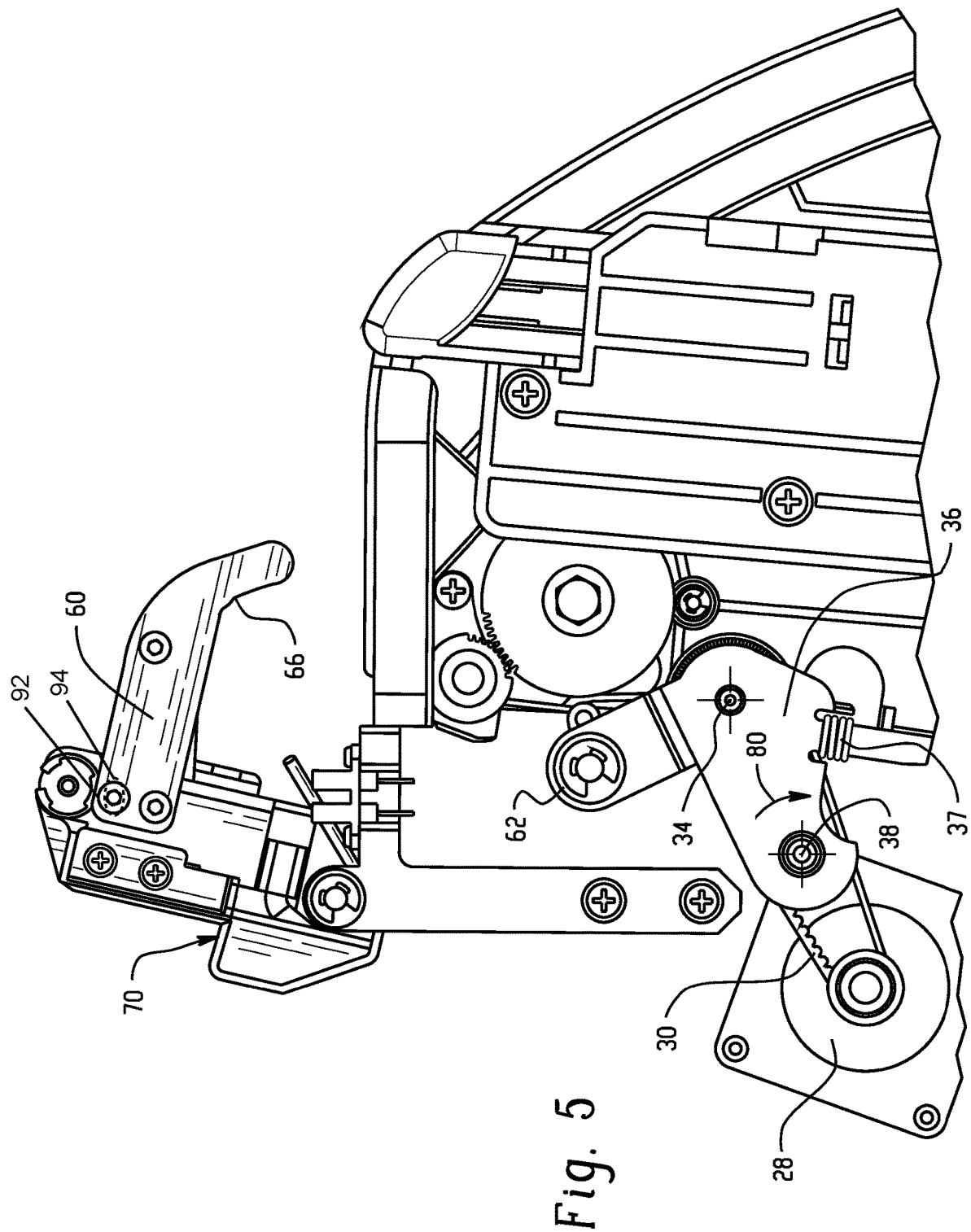
FIG. 5 is a schematic view of the retaining mechanism locking arm in gear train release position.

In FIGS. 2, 3 and 5, the locking arm 60 is shown in a gear train release position in which the locking arm 60 does not interact with the pivot arm 36 of the drive assembly 26. The locking arm 60 is rotatable into a gear train coupling position, shown in FIG. 4, in which the locking arm 60 engages with a bearing 62 carried on the pivot arm 36. In this orientation, movement of the pivot arm 36 in the direction of arrow 80, which would result in the drive gear axis 34 moving away from the driven gear, is prevented. Thus, the locking arm 60 enables the gear train to be driven in reverse (e.g., for moving label stock in reverse) without the drive gear 30 walking away from the driven gear 42. In one embodiment, the locking arm 60 may include an edge recess 66 that engages the bearing 62 to provide a detent feature when the locking arm is in the gear train coupling position. However, the detent feature is not required.

The locking arm 60 may be mounted by fasteners to the cutter assembly by one or more screws 92 engaged in one or more slots 94. The slots are sized and shaped to permit some adjustment of the position of the locking arm (when the screws are loosened) so that the locking arm can be fixed in a position (e.g., by tightening of the screws) that will assure that the edge of the locking arm 60 engages the bearing or roller 62 to achieve the desired effect of holding the drive gear 32 in position engaged with the driven gear 42.

Although the illustrated retaining mechanism uses a locking arm rotatably connected to the housing 12. Other variations are possible. For example, the locking arm could be rotatably mounted on the housing or the cassette 18 (e.g., per arm 60' shown schematically in FIG. 2), so as to automatically be shifted from a gear train release position into the gear train coupling position when the cassette is moved into its operating position within the housing slot 20. In such an arrangement, the retaining mechanism could serve a dual function of gear train coupling and latching the cassette in its operating position.

Although a retaining mechanism including a rotating locking arm is primarily described, it is recognized that retaining mechanisms that utilize linearly moving locking members (mounted on either the printer device housing 12 or the cassette housing) are also possible. Such locking members could be biased toward the gear train coupling position for engaging part of the drive assembly 26, and/or could be automatically shifted into the gear train coupling position upon cassette insertion.

Although the drive gear on the base in the above-described embodiment is mounted for movement such that a position of an axis of the drive gear is movable, in an alternative embodiment the drive gear could be mounted so that the position of the axis of the drive gear is fixed, in which case the driven gear of the cassette could be mounted so that its axis is movable on the cassette in order to provide a degree of play that facilitates engagement between the drive gear and the driven gear when the cassette is inserted into the printer housing slot.

It is to be clearly understood that the above description is intended by way of illustration and example only, is not intended to be taken by way of limitation, and that other changes and modifications are possible.

What is claimed is:

1. A printer device, comprising:
   a main housing including a print media cassette receiving slot;
   a first drive assembly mounted to the main housing, the first drive assembly including a motor operatively coupled to rotate a drive gear;
   a print media cassette removably inserted into the print media cassette receiving slot, wherein the print media cassette includes a second drive assembly having a driven gear that is engaged with the drive gear of the first drive assembly;
   wherein one of the drive gear or the driven gear is mounted for movement such that at least one of:
   (i) a position of an axis of the drive gear is movable relative to the main housing;
   or
   (ii) a position of an axis of the driven gear is movable relative to the cassette;

a retaining mechanism including a portion movable between a gear train coupling position and a gear train release position, wherein, in the gear train coupling position, the portion is positioned to hold the drive gear and the driven gear in driving contact with each other, wherein, in the gear train release position, the portion is positioned to allow movement of at least one of:
  (i) the axis of the drive gear relative to the main housing; or
  (ii) the axis of the driven gear relative to the cassettes;
wherein the portion comprises a locking arm that is located externally of the main housing.

2. The printer device of claim 1, wherein, in the gear train coupling position, the portion cooperates with the first drive assembly to hold the drive gear in driving contact with the driven gear, wherein, in the gear train release position, the portion is positioned to allow movement of the axis of the drive gear away from the driven gear.

3. The printer device of claim 1, wherein the locking arm is rotatably connected to the main housing.

4. The printer device of claim 3, wherein the drive gear is mounted on a pivot arm with an associated pivot axis that is spaced from the axis of the drive gear, wherein the retaining mechanism further comprises a bearing carried on the pivot arm, wherein the locking arm engages the bearing when the locking arm is in the gear train coupling position, wherein the locking arm is spaced away from the bearing when the locking arm is in the gear train release position.

5. The printer device of claim 4, wherein the locking arm includes a recess that engages the bearing to provide a detent feature when the locking arm is in the gear train coupling position.

6. The printer device of claim 3, wherein the locking arm is mounted for movement with a pivoting assembly, and a fixed position of the locking arm on the pivoting assembly is adjustable.

7. The printer device of claim 3, wherein the locking arm is mounted for movement with a cutter assembly.

8. The printer device of claim 1, wherein the locking arm is mounted to the printer cassette.

9. The printer device of claim 1, wherein the portion is mounted to the printer cassette.

10. The printer device of claim 9, wherein the portion is biased into the gear train coupling position.

11. A scale, including the printer device of claim 1, further comprising:
  a load cell mounted to the housing;
  a weigh platter operatively connected to the load cell.

12. The printer device of claim 1, wherein the locking arm is moveable between the gear train coupling position and the gear train release position, wherein, in the gear train release position the locking arm is positioned alongside the main housing, wherein, in the gear train coupling position, the locking arm is positioned beneath the main housing.

13. A method of engaging a printer cassette in a cassette slot of a main housing of a printer device, the method comprising:
  (a) while a locking arm is in a gear train release position, moving the printer cassette into the cassette slot such that a driven gear of the printer cassette is moved into engagement with a drive gear of the main housing, with at least one of (i) a position of an axis of the drive gear moving relative to the main housing during the engagement or (ii) a position of an axis of the driven gear moving relative to the printer cassette during the engagement;
  (b) moving the locking arm into a gear train coupling position in which the locking arm causes the drive gear and the driven gear to remain engaged by limiting movement of at least one of (i) the position of the axis of the drive gear relative to the main housing or (ii) the position of the axis of the drive gear relative to the printer cassette;
  wherein, in both the gear train release position and the gear train coupling position, the locking arm is positioned externally of the main housing.

14. The method of claim 13 wherein the locking arm is mounted for movement with a cutter assembly that is moved during step (b).

15. The method of claim 13 wherein the drive gear is mounted on a pivot arm with an associated pivot axis that is spaced from the axis of the drive gear, wherein a bearing is carried on the pivot arm, wherein the locking arm engages the bearing when the locking arm is moved into the gear train coupling position, wherein the locking arm is spaced away from the bearing when the locking arm is in the gear train release position.

16. The method of claim 13, wherein the locking arm is located beneath the main housing when in the gear train coupling position.

17. A printer device, comprising:
  a main housing including a print media cassette receiving slot;
  a first drive assembly mounted to the main housing, the first drive assembly including a motor operatively coupled to rotate a drive gear having a rotation axis, wherein the drive gear is mounted such that a location of the rotation axis is movable relative to the main housing;
  a print media cassette removably inserted into the print media cassette receiving slot, wherein the print media cassette includes a second drive assembly having a driven gear that is engaged with the drive gear of the first drive assembly;
  a retaining mechanism including a portion movable between a gear train coupling position and a gear train release position, wherein, in the gear train coupling position, the portion is positioned to hold the drive gear and the driven gear in driving contact with each other by inhibiting movement of the location of the rotation axis of the drive gear, wherein, in the gear train release position, the portion is positioned to allow disengagement of the drive gear and the driven gear;
  wherein the portion includes a locking arm that is moveable between the gear train coupling position and the gear train release position, wherein the locking arm is located externally of the main housing to enable manual movement of the locking arm between the gear train coupling position and the gear train release position while the print media cassette is inserted in the print media cassette receiving slot.

* * * * *